United States Patent [19]

Llorach

[11] 4,367,727

[45] Jan. 11, 1983

[54] COLLECTORS OF SOLAR ENERGY TRAPPING DEVICES

[76] Inventor: Alfredo B. Llorach, Avenida Sindical 22, Palma de Mallorca, Spain

[21] Appl. No.: 179,550

[22] Filed: Aug. 19, 1980

[30] Foreign Application Priority Data

Aug. 21, 1979 [ES] Spain ..................................... 483.541

[51] Int. Cl.³ ................................................ F24J 3/02
[52] U.S. Cl. ................................... 126/449; 126/432; 165/DIG. 10
[58] Field of Search ....................... 126/443, 901, 449; 165/DIG. 10

[56] References Cited

U.S. PATENT DOCUMENTS

| 3,102,532 | 9/1963 | Shoemaker | 126/901 |
| 3,981,293 | 9/1976 | Gillery | 126/901 |
| 4,177,794 | 12/1979 | Novinger | 126/449 |
| 4,186,721 | 3/1980 | Whitman | 126/449 |
| 4,237,868 | 12/1980 | Overton | 126/443 |

FOREIGN PATENT DOCUMENTS 2629086  12/1978  Fed. Rep. of Germany ...... 126/449

Primary Examiner—Samuel Scott
Assistant Examiner—G. Anderson
Attorney, Agent, or Firm—McGlew and Tuttle

[57] ABSTRACT

An improved solar collector is disclosed which includes a light absorbent component composed of a filamentous structure and a coating of solar radiation absorbent material on the filaments of the filamentous structure.

1 Claim, 5 Drawing Figures

COLLECTORS OF SOLAR ENERGY TRAPPING DEVICES

FIELD AND BACKGROUND OF THE INVENTION

The present invention relates to improvements in the collectors of solar energy trapping devices.

Known collectors used in the solar energy trapping devices for its conversion into heating energy, show a high percentage of losses due to the effect of re-emission, convection, conduction and reflection of solar light on the own absorbent surface and others.

Remedies to these problems have been sought and in some cases, the losses due to the effect of convection and re-emission have been somewhat reduced.

SUMMARY OF THE INVENTION

With the present invention, such losses are minimized and the conversion of solar light into heating energy is remarkably improved, with highly relevant results achieved. Essentially, the improvement is achieved by multiplying by a high factor the solar light absorption surface and using simple inexpensive components, thereby greatly increasing the profitability of the solar energy trapping devices, equipment and installations.

According to the invention, the converting absorbent component of light energy into heat will be composed of a filamentous structure with the black body properties.

Accordingly, it is an object of the invention to provide an improved solar collector comprising a light absorbent component composed of a filamentous structure and a coating of a solar radiation absorbent material on the filaments of the filamentous structure. In accordance with a preferred embodiment of the invention, a plurality of the filamentous structures are successively arranged in layers. The successively arranged layers preferably have a progressively increasing density of the filaments. In accordance with the teachings of the invention, a receptacle of a transparent material is utilized to house the light absorbent component. In an alternate embodiment, the heat absorbent component is mounted to the outside of the receptacle. In accordance with further preferred embodiments of the invention, the receptacle may take the shape of one of a spheroid and a tubular body. In that means connected to the receptacle pass a heat retaining fluid into direct or indirect heat transfer relationship with the heat absorbent component.

A further object of the invention provides an improved solar collector which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

Figure 1:
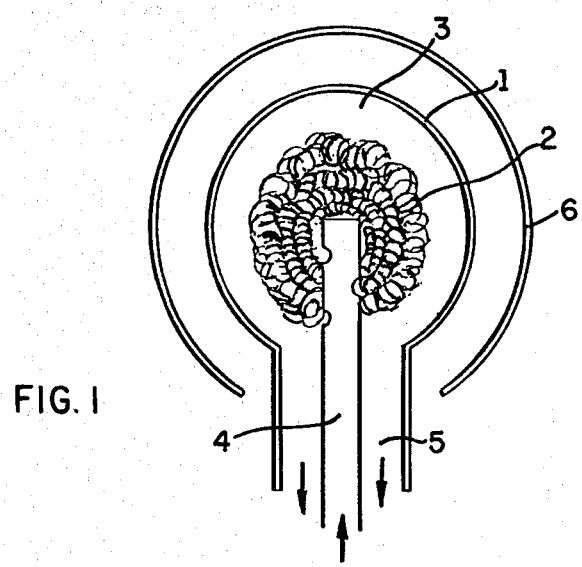
FIG. 1, shows in a schematic elevation section, a spheroid type collector.

According to the invention, the solar radiation collecting device is composed for example, of a metal body having an outer black coated surface, through the inside of which flows the heat holding fluid. The collector is suitably located at the focus of a cap revolution concentrating mirror A shown in FIG. 1, the collector comprises a transparent receptacle 1 within which a filamentous fill is bathed by a heat holding fluid 2. The filamentous fill 2 is preferably composed of a metallic material that has a surface coated by a solar radiation absorbent layer (for example, black chromium) to afford, to such a surface, very good black body properties. This filamentous structured component directly transmits the heat collected to the heat holding fluid 3 flowing around and across the filamentous material. The fluid is supplied and extracted by means of the associated coaxial conduits 4 and 5.

Due to the large surface area of the filamentous structure 2, the light easily passes into the multiple spaces between the filaments, thereby many times reflecting and striking thereon until its complete absorption and conversion into heating energy as if the structure an ideal "black" cavity or black body.

Advantageously, successive layers of this filamentous structure 2, either a terry type (as a sponge) or a mesh, will have a different density progressively increasing in the direction of light that traverses the layers consequently improving the absorption. The filamentous structure can also be formed, for example, with its filaments arranged like a brush, in which case its free ends would be arranged as oriented towards the incidence's direction of the solar ray beam.

To avoid any leaks caused by re-emission, convection and conduction, the collector receptacle 1 is covered by an outwardly thermal protection shell 6 of any type already known.

Figure 2:
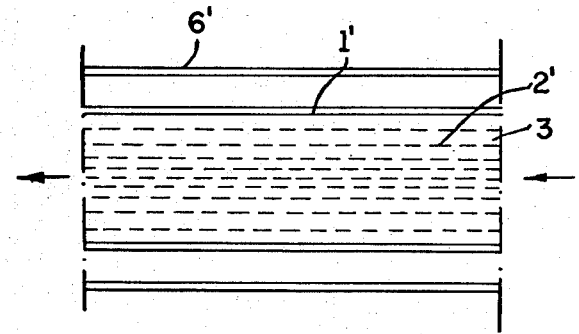
FIGS. 2 and 3 show, respectively, in a schematic transverse and longitudinal section, a cylindrical type collector.
Figure 3:
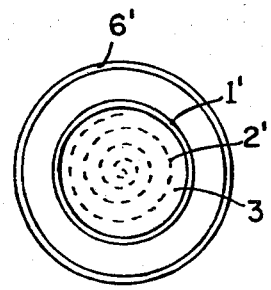

According to FIG. 2, the collector 1' is tubular, and suitable for use in the focal line of a parabolic cylindrical concentrating mirror. The tubular collector 1' is made of material which is transparent. The filamentous structure 2', in this embodiment as composed of a concentricly layered coiled mesh, or net, that has a surface also covered by a radiation absorbent layer. Along the tubular body 1', the flowing heat holding fluid 3 crosses the mesh of structure 2' which yields the heat to the fluid. In the FIG. 3, the coiled arrangement of the filamentous structure occupying the collector tubular body is more clearly illustrated. The thermoinsulating shell 6' is tubular and coaxial to the tubular body 1'.

Should the heat holding fluid be subjected to heavy pressures, as required by the solar energy trapping installation, then it would be advisable to arrange the filamentous structure away from the collector body through which the fluid flows.

Figure 4:
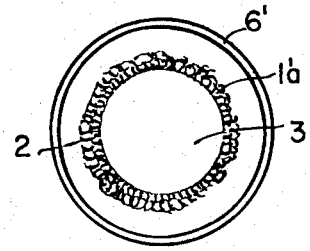
FIGS. 4 and 5 illustrate also in a schematic elevation section, respectively, a cylindrical and spheroid collector with the absorbent component in accordance with other embodiments of the invention.

Thus in the FIG. 4, the heat holding fluid 3 flows through a metal piping 1'a and the filamentous structure (in this figure a sponge 2) is located outside said tubular body and is mounted thereon in a very close contact so that the heat collected from the filaments is transferred to the tubular receptacle and the to the heat holding fluid flowing through is conductively transmitted.

Figure 5:
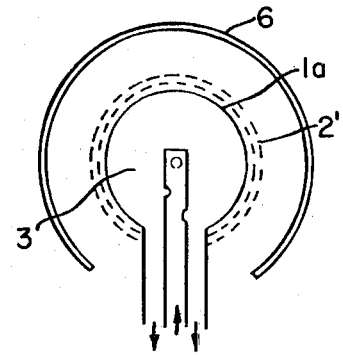

In FIG. 5, there is illustrated an analogous embodiment applied to a spheroid type metal collector 1a, on which surface is arranged a meshy filamentous structure 2' and through which inside is flowing the heat holding fluid 3.

In both the embodiments of FIGS. 4 and 5, protection would also be used in the fan of an outside shell 6' and 6, respectively, tubular or spheroid.

The invention, within its essentiality, can be made practicable in other ways of embodiment which might differ in some detail of those shown only as an example hereinbefore, and to which ways of embodiment would also reach the protection being requested herein. This collector, then, could be embodied with the most suitable filamentous structure and with the most adequate means and components, as all of them are included in the scope of the following claims.

While specific embodiments of the invention have been shown and described in detail to illustrate the application of the principles of the invention, it will be understood that the invention may be embodied otherwise without departing from such principles.

As an object of the present invention patent is claimed:

1. A solar collector comprising:
   a spherical transparent receptacle defining a spherical space and having an opening at the bottom thereof;
   an outer conduit connected to said receptacle at said opening and depending downwardly from said receptacle;
   an inner conduit coaxial with said outer conduit extending through said opening and into said space, said inner conduit terminating at an upper end thereof near a center of said sphere, said inner conduit having a plurality of openings therein in said space;
   a plurality of spherical layers of metallic filamentation material having a black solar radiation absorbing coating disposed in said space and centered about the center of said space and around said inner conduit and over said inner conduit openings, said plurality of layers having progressively increasing density of filamentatious material toward the center of said space; and
   a spherical thermal protection shell surrounding and at all locations spaced from said transparent spherical receptacle having an opening at the bottom thereof for the passage of said outer conduit;
   said inner conduit adapted for receiving a heat transfer fluid and discharging the fluid through said filamentatious material into said space, said outer conduit adapted for passing the fluid out of said space.

* * * * *